Figure 1:
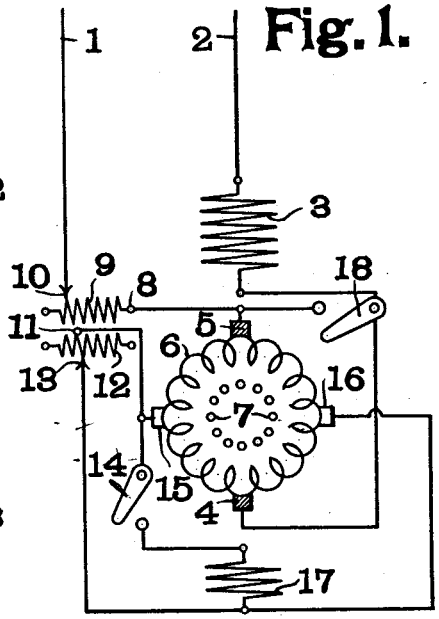

V. A. FYNN.
ALTERNATING CURRENT MOTOR.
APPLICATION FILED JUNE 12, 1911.

1,085,808.

Patented Feb. 3, 1914.
2 SHEETS—SHEET 1.

WITNESSES:
L. L. Mead,
W. A. Alexander.

INVENTOR
Valère A. Fynn,
BY
Fowler & Huffman
ATTORNEY

V. A. FYNN.
ALTERNATING CURRENT MOTOR.
APPLICATION FILED JUNE 12, 1911.

1,085,808.

Patented Feb. 3, 1914.
2 SHEETS—SHEET 2.

WITNESSES:
L. L. Mead,
W. H. Alexander.

INVENTOR
Valère A. Fynn,
BY
Fowler & Huffman
ATTORNEY

UNITED STATES PATENT OFFICE.

VALÈRE ALFRED FYNN, OF LONDON, ENGLAND.

ALTERNATING-CURRENT MOTOR.

1,085,808.  Specification of Letters Patent.  Patented Feb. 3, 1914.

Application filed June 12, 1911. Serial No. 632,581.

*To all whom it may concern:*

Be it known that I, VALÈRE ALFRED FYNN, a subject of the King of England, residing at London, England, have invented a certain new and useful Alternating-Current Motor, of which the following is such a full, clear, and exact description as will enable any one skilled in the art to which it appertains to make and use the same, reference being had to the accompanying drawings, forming part of this specification.

My invention relates to alternate current motors having a commuted and a permanently short-circuited winding on the revolving member, such a squirrel cage, and is particularly applicable to single phase motors capable of being operated as self-excited shunt induction machines.

It has been heretofore proposed by me to improve the starting of such motors by short circuiting the commuted winding by way of working brushes, for instance on a line approximately coinciding with the axis of the main inducing winding and conducting in one way or another, an alternating current through the said commuted winding along another axis thus producing an effective torque yielding flux. This arrangement is particularly effective when a magnetic shunt or bridge is provided between the commuted and the permanently short-circuited winding. In all cases both rotor windings act as secondaries to the main inducing winding and the secondary ampere turns are, therefore, distributed between the two induced windings. I have discovered that most of the torque is due to the current induced in the commuted winding approximately in line with the main inducing winding and to the flux produced along an axis displaced from that of the main inducing winding, apparently because all of the said flux links with the induced ampere turns in the commuted winding, but only part of the said flux links with the induced ampere turns in the other induced winding, to which I will henceforth refer as the squirrel cage winding, this being its simplest and most frequent form. This condition of things is particularly apparent when the two induced windings are separated by a magnetic bridge or shunt.

My main object is to improve the starting performance of such machines by increasing the current, *i. e.* the ampere turns in the commuted winding along the axis of the main inducing winding for a given current or a given number of ampere turns in the main inducing winding. I achieve this object by conductively conveying current to the commuted winding along said axis. For this purpose I connect the working brushes to the mains either directly or with the interposition of a transformer and either in parallel to, or in series with the main inducing winding. I believe that I thereby concentrate the rotor ampere turns in the commuted winding along the axis of the main inducing winding, thus relieving the squirrel cage along that axis, and placing the rotor ampere turns in a better space location as far as torque producing properties are concerned. Tests which I have carried out confirm this theory inasmuch as a motor constituted as here described shows a considerably greater starting torque per ampere for a given terminal voltage than a machine in which the working brushes are simply short-circuited. When a sufficient speed has been reached I prefer to short circuit the working brushes and I may provide means for compensating the motor.

My invention and its scope will be better understood by reference to the following description taken in conjunction with the accompanying drawings, in which—

Figure 2:
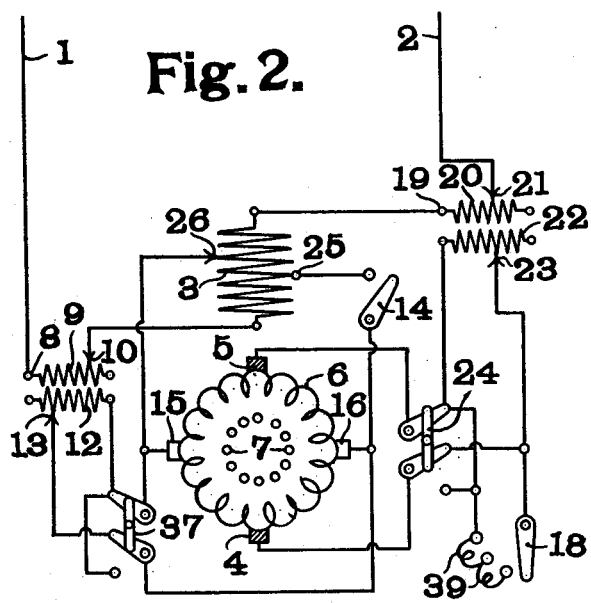
Figure 3:
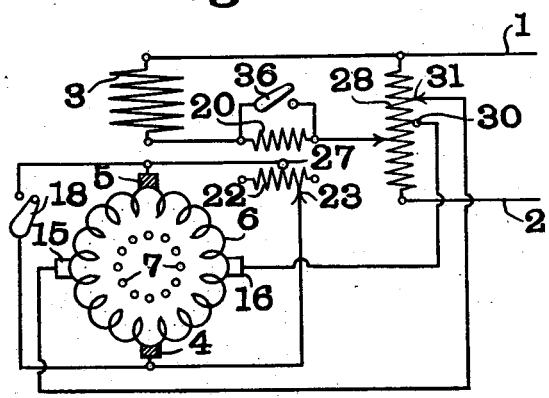
Figure 4:
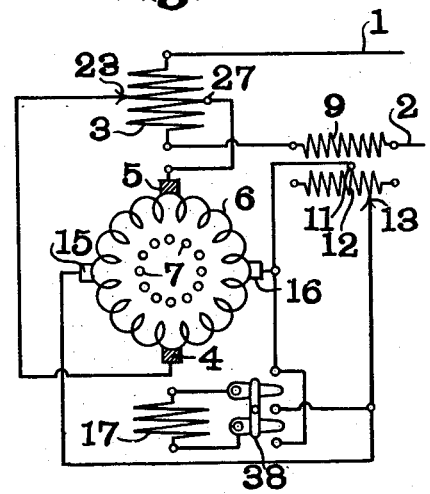
Figure 5:
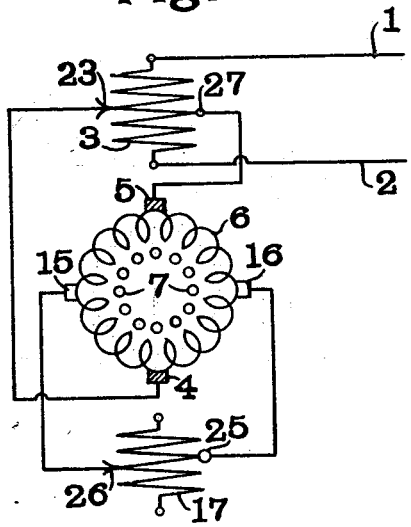
Figure 6:
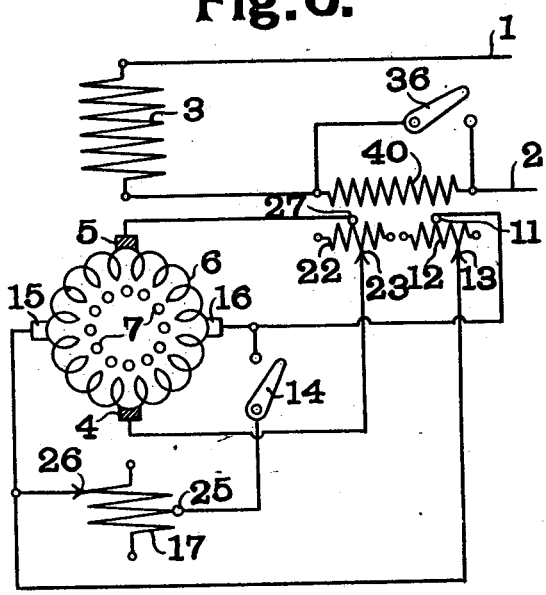
Figure 7:
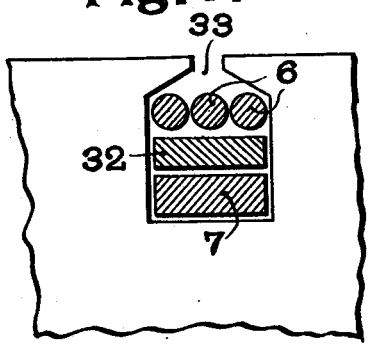
Figure 8:
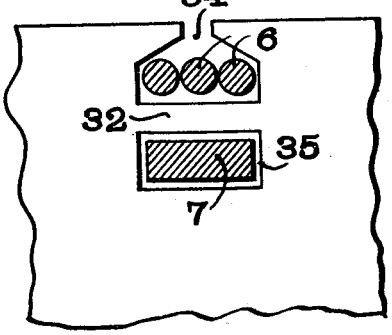

Figure 1 is a simple form of my invention, the main inducing winding being connected in series relation with the rotor along two axes. In Fig. 2 the series relation between stator and rotor is brought about along both axes by means of series transformers. In Fig. 3 the rotor is connected in series relation with the stator along the working axis, and in parallel to it along the exciting axis. In Fig. 4 the reverse is the case. In Fig. 5 the rotor is connected in parallel relation with the stator along two axes. In Fig. 6 two rotor circuits are conductively supplied from a single transformer. Fig. 7 shows one form of magnetic bridge or shunt between the two rotor windings, and Fig. 8 shows another form of such a bridge.

Referring to Fig. 1, the rotor carries a commuted winding 6 and a squirrel cage winding 7, the stator a main inducing winding 3 and a compensating winding 17. All switches are shown in their starting positions. The main inducing winding is connected to main 2 on one side and to the working brush 4 on the other, the circuit being completed through the winding 6, the working brush 5, the primary 9 of a series transformer, and the movable contact 10 thereof to main 1. Point 11 of the secondary 12 of the series transformer is connected to the exciting brush 15, while the exciting brush 16 connects to 12 by way of the movable contact 13. Brush 16 is also connected to one end of the compensating winding 17, while the other end thereof can be connected to brush 15 by closing switch 14. Brush 4 can be directly connected to brush 5, thus short-circuiting the commuted winding along the axis of 3 by closing switch 18. The magnitude and direction of the starting torque depends on the position of the movable contact 13 relative to point 11 of the secondary 12 of the series transformer. The magnitude of this torque can also be adjusted by means of the movable contact 10. When the motor has reached a sufficient speed I prefer to close switch 18. The brushes 15 and 16 can be short-circuited after a sufficient speed has been reached by moving contact 13 to point 11 when the speed of the machine will at no time exceed the synchronous, but I prefer to limit the speed of the machine and to simultaneously compensate it by closing switch 14 after which the series transformer can be cut out of circuit if desired, for instance by moving contact 10 to point 8 and disconnecting contact 13 from 12. Owing to commutation requirements the best starting conditions will but seldom be secured by a plain series connection of 3 and 6. It will usually be necessary to interpose a series transformer between the two windings.

In Fig. 2 main 1 is connected to the primary 9 of one series transformer, the circuit being completed through the movable contact 10, the main inducing winding 3, the primary 20 of a second series transformer and the movable contact 21 to main 2. The commuted winding 6 is connected in series relation with 3 along the exciting axis by means of the secondary 12 of the first series transformer, the movable contact 13, the reversing switch 37 and the exciting brushes 16 and 15. That same winding is connected in series relation with 3 along the working axis by means of the secondary 22 of the second series transformer, the movable contact 23, the reversing switch 24, and the working brushes 4 and 5. These brushes can be gradually short-circuited by means of the switch 18 co-acting with the resistance 39. The compensating E. M. F. is taken from the main inducing winding 3 itself, and to this end brush 15 is connected to 3 by way of the movable contact 26 and brush 16 can be connected to point 25 of 3 by closing switch 14. The position of 26 relative to 25 determines the magnitude and the direction of the compensating E. M. F. The mode of operation is the same as for Fig. 1.

In Fig. 3 the mains 1 and 2 are connected to the transformer 28 and the main inducing winding 3 is fed from 28 through the primary 20 of a series transformer. The volts per turn impressed on 3 can be adjusted by means of the movable contact 29. The commuted winding 6 is connected in series relation with 3 or with the mains by way of the working brush 5, point 27 of the secondary 22 of said series transformer, the movable contact 23 and the working brush 4. The ratio of the currents and their relative direction in 3 and in 6 along the working axis is controlled by the position of the movable contact 23 relative to point 27. The working brushes can be directly short circuited by means of the switch 18. The commuted winding 6 is connected in parallel relation to 3 or to the mains along the exciting axis by way of the transformer 28. Brush 16 is connected to point 30, and brush 15 to the movable contact 31. The magnitude and direction of the starting torque or of the compensating E. M. F. depend on the position of 31 relative to 30. The magnitude of the starting torque also depends on the position of 23 relative to 27, and on the position of contact 29. The primary 20 of the series transformer can be short circuited by means of switch 36. After the motor has reached a sufficient speed I close switch 18 and can also close switch 36. If a high power factor is desired then 31 must be adjusted accordingly after the motor has reached a sufficient speed. The E. M. F. to be impressed on the exciting brushes in order to secure a large starting torque is generally considerably larger than that required for compensating the motor at normal speed and this is why an adjustment of 31 is desirable.

In Fig. 4 the main inducing winding is connected on one side to main 1, on the other to main 2 through the primary 9 of a series transformer. The commuted winding 6 is connected in series relation with 3, or with the mains, along the exciting axis by way of brush 16, point 11 of the secondary 12 of the series transformer, the movable contact 13 on 12, and the brush 15. The compensating winding 17 can be connected to the exciting brushes 15, 16 in one of the other direction, by closing the reversing switch 38 in one or the other direction. The commuted winding 6 is connected in parallel relation to 3, or to the mains along the working axis by way of the brush 5, point 27 of 3, the movable contact 23 on 3 and brush 4. The magnitude and direction of the starting torque depends on the position of 13 relative to point 11. The magnitude of the torque also depends on the position of 23 relative to point 27. After the motor has reached a sufficient speed contact 23 is preferably moved to point 27 thus directly short circuiting the working brushes, and if desired, 13 can be disconnected from 12 and the switch 38 can be closed in such a direction as to compensate the machine.

In Fig. 5 the main inducing winding 3 is directly connected to the mains 1, 2. The commuted winding 6 is connected in parallel relation to 3 or to the mains along the working axis by way of brush 5, point 27 of 3, the movable contact 23 on 3 and the brush 4. This same winding is also connected in parallel relation to 3 or to the mains along another axis by way of brush 16, point 25 of the winding 17, the movable contact 26 on 17 and the brush 15. The direction and magnitude of the starting torque, or the degree of compensation depend on the position of 26 relative to 25. The magnitude of this starting torque also depends on the position of 23 relative to 27. After the machine has reached a sufficient speed contact 23 is preferably moved to point 27 and contact 26 so adjusted as to give the desired power factor.

In Fig. 6 the commuted winding 6 is fed conductively along two axes from a transformer with two secondaries 12, 22. The primary 40 of this transformer is connected across the mains 1, 2 in series with the main inducing winding 3. The rotor working circuit is fed from the secondary 22, brush 5 being connected to point 27 and brush 4 to the movable contact 23. The rotor exciting circuit is fed from the secondary 12, brush 16 being connected to point 11 and brush 15 to the movable contact 13. The compensating stator winding 17, coaxially disposed with 3 is connected to brush 15 by way of the movable contact 26 and its point 25 can be connected to brush 16 by closing switch 14. The magnitude of the starting torque depends on the position of the contact 23 relative to point 27 of the secondary 22. The magnitude and direction of the starting torque depends on the position of contact 13 relative to point 11 of the secondary 12. The degree of compensation depends on the position of contact 26 relative to the point 25 of the compensating winding 17. The connection shown in Fig. 6 has one peculiarity not possessed by the previous diagrams; the sum of the ampere turns in the secondaries 12 and 22 must always be nearly equal to the ampere turns in the primary 40 of the transformer, but the secondary ampere turns are free to distribute themselves between the two secondaries according to the apparent impedance of their respective circuits. At the moment of starting the impedance in the circuit of the brushes 15, 16 is generally higher than in the circuit of the brushes 4, 5, but the apparent impedance in the exciting circuit tends to diminish with increasing speed, with the result that as the speed increases the greater proportion of secondary ampere turns is carried by the secondary 12, and the squirrel cage is thereby allowed to come into play more and more along the axis of the main inducing winding. When a sufficient speed has been reached I prefer to place the contact 23 on point 27, close switch 14 adjusting the contact 26 to secure the desired compensation, open the circuit of the secondary 12 and short circuit 40 by closing switch 36. Instead of the above changes in the connection it is sufficient to move contact 23 on to point 27 and to close switch 14 if desired.

In all cases I prefer to separate the commuted and the squirrel cage windings by means of a magnetic shunt or bridge, so disposed that magnetic flux can link with one winding without linking with the other. Two forms of such a bridge are shown in Figs. 7 and 8. In Fig. 7 the permanently short circuited winding 7 lies at the bottom of the rotor slot 33 and is separated from the commuted winding 6 by a solid iron or steel bridge 32 placed in said slot. Such a bridge is inductively responsive to any flux threading same because Foucault currents are set up in the solid steel or iron. In Fig. 8 the commuted winding 6 is disposed in the open rotor slots 34 while the squirrel cage 7 or its equivalent, is placed in slots or holes 35 so punched out of the rotor laminations as to leave a bridge 32 between the closed and the open slots.

Although the invention has been more particularly described with reference to two-pole motors, with revolving induced member, yet it will be understood that it is equally well applicable to motors having any number of pole pairs and that the induced instead of the inducing member can be stationary.

Having fully described my invention, what I claim as new and desire to secure by Letters Patent of the United States, is:

1. In an alternating current motor, the combination with an inducing member, of an induced member provided with a commuted winding and a permanently short circuited winding, and means for supplying current to the commuted winding along two axes.

2. In an alternating current motor, the combination with an inducing member provided with an inducing winding, of an induced member provided with a commuted winding and a permanently short-circuited winding, and means for supplying current to the commuted winding along two axes one of which approximately coincides with the axis of the inducing winding.

3. In an alternating current motor, the combination with an inducing member, of an induced member provided with a commuted winding and a permanently short-circuited winding, a magnetic shunt or bridge separating said windings, and means for supplying current to the commuted winding along two axes.

4. In an alternating current motor, the combination with an inducing member, of an induced member provided with a commuted winding and brushes and a permanently short circuited winding, means including said brushes for supplying current to the commuted winding along two axes and means for short-circuiting certain of said brushes.

5. In an alternating current motor, the combination with an inducing member provided with an inducing winding, of an induced member having a commuted winding and a permanently short circuited winding, working brushes on the induced member coaxial with the inducing winding and connected in series relation thereto, exciting brushes on the induced member displaced from the working brushes, and means for supplying current to the exciting brushes.

6. In an alternating current motor, the combination with an inducing member provided with an inducing winding, of an induced member having a commuted winding and a permanently short-circuited winding, working brushes on the induced member coaxial with the inducing winding and connected in series relation thereto, exciting brushes on the induced member displaced from the working brushes, means for supplying current to the exciting brushes, and means for short circuiting the exciting brushes.

7. In an alternating current motor, the combination with an inducing member, of an induced member provided with a commuted winding and brushes and a permanently short circuited winding, means including said brushes for supplying current to the commuted winding along two axes, and means for impressing a compensating E. M. F. on certain of said brushes.

8. In an alternating current motor, the combination with an inducing member, of an induced member provided with a commuted winding and brushes and a permanently short-circuited winding, a magnetic shunt or bridge separating said windings, means including said brushes for supplying current to the commuted winding along two axes, and means for impressing a compensating E. M. F. on certain of said brushes.

9. In an alternating current motor, the combination with an inducing member, of an induced member provided with a commuted winding and a permanently short-circuited winding, a magnetic shunt or bridge separating said windings, working brushes and exciting brushes coöperating with the commuted winding, means including said brushes for supplying current to the commuted winding along two axes, and means for impressing a compensating E. M. F. on the exciting brushes.

10. In an alternating current motor, the combination with an inducing member, of an induced member provided with a commuted winding and a permanently short-circuited winding, a magnetic shunt or bridge separating said windings, working brushes and exciting brushes coöperating with the commuted winding, means including said brushes for supplying current to the commuted winding along two axes, means for short-circuiting the working brushes, and means for impressing a compensating E. M. F. on the exciting brushes.

11. In an alternating current motor, the combination with a stationary member provided with a main winding, of a revolving member provided with a commuted winding and a permanently short-circuited winding, working brushes coaxial with the main stator winding, exciting brushes displaced from the working brushes, means including the working brushes for connecting the main stator winding and the commuted winding in opposition and in series relation to each other, means for supplying current to the exciting brushes, and means for short-circuiting the working brushes.

In testimony whereof, I have hereunto set my hand and affixed my seal in the presence of the two subscribing witnesses.

VALÈRE ALFRED FYNN. [L. S.]

Witnesses:
W. A. ALEXANDER,
ELIZABETH BAILEY.

---

Copies of this patent may be obtained for five cents each, by addressing the "Commissioner of Patents, Washington, D. C."